G. T. PARR.
FROG BOX.
APPLICATION FILED MAR. 16, 1917.
1,356,400.
Patented Oct. 19, 1920.
2 SHEETS—SHEET 1.
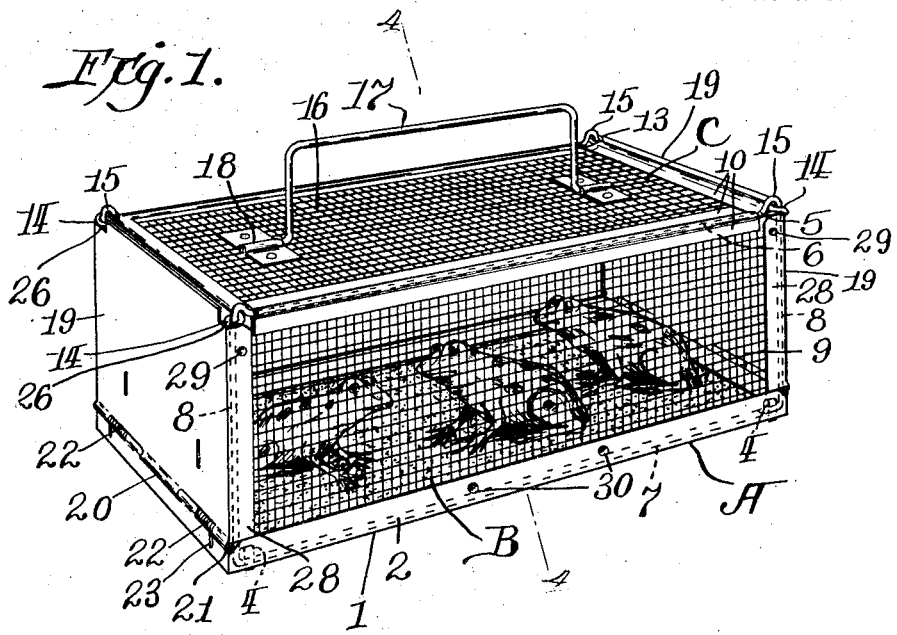
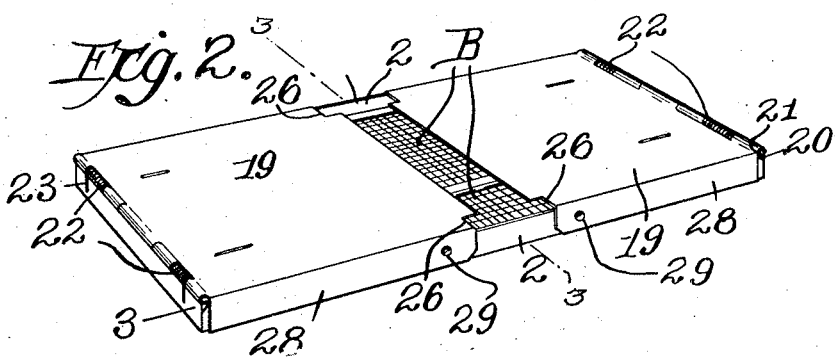
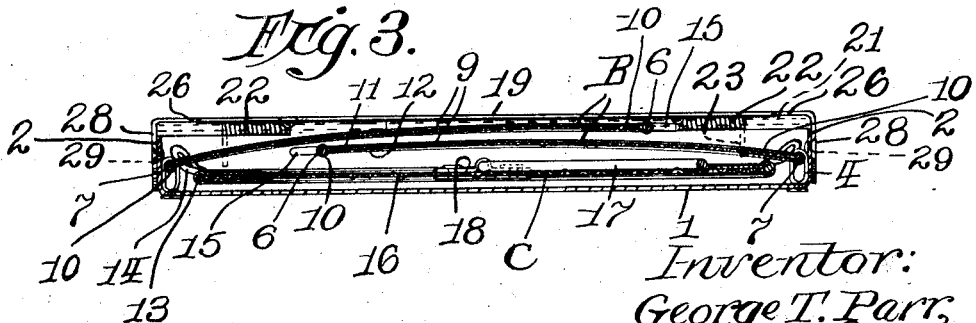
Inventor:
George T. Parr,
by Howard Fischer
Attorney.

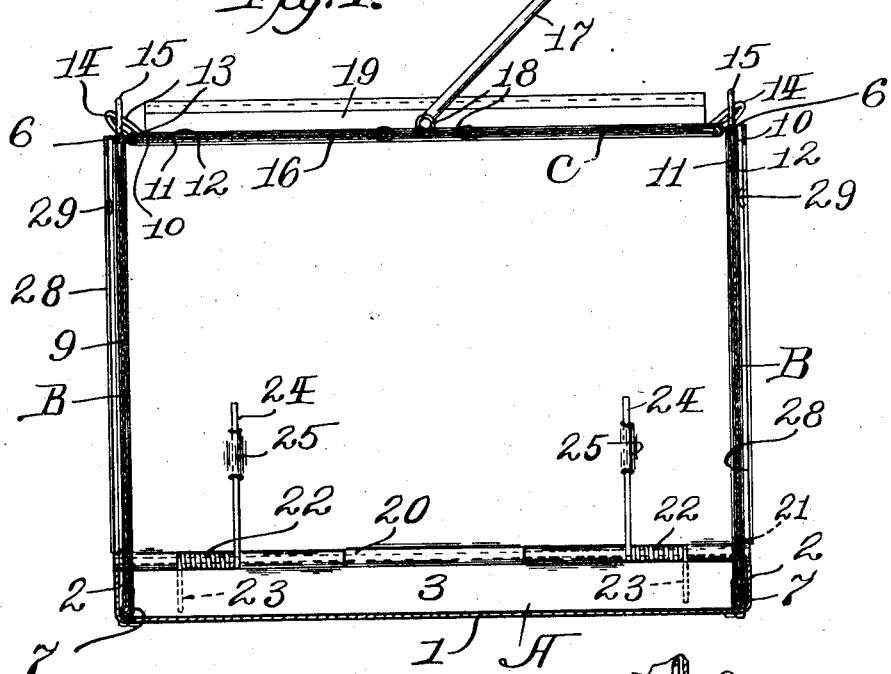
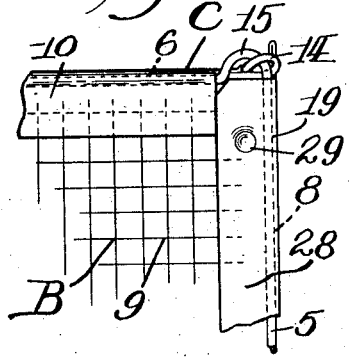
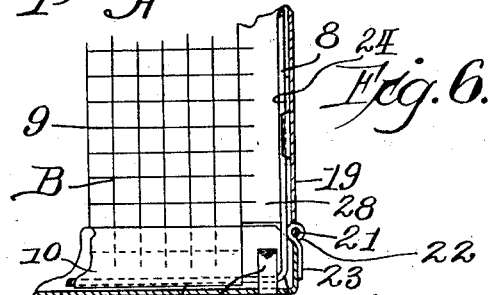
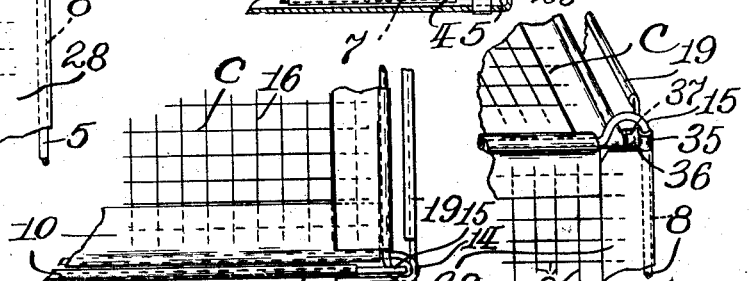

UNITED STATES PATENT OFFICE.

GEORGE T. PARR, OF ST. PAUL, MINNESOTA.

FROG-BOX.

1,356,400. Specification of Letters Patent. Patented Oct. 19, 1920.

Application filed March 16, 1917. Serial No. 155,359.

*To all whom it may concern:*

Be it known that I, GEORGE T. PARR, a citizen of the United States, residing at St. Paul, in the county of Ramsey and State of Minnesota, have invented a new and useful Improvement in Frog-Boxes, of which the following is a specification.

My invention relates to frog boxes or cages which are collapsible so that when the box is not in use, it can be collapsed to very small dimensions and carried in a fishing kit or in the pocket of the user without burdening him.

The primary object of this device being in having a box in which the top is slidably secured to the side walls so that when the box is collapsed, the top and side walls will be contained in the bottom of the box and the end walls will fold over the same, being locked to the bottom so as to hold the box closed.

It is also an object to have a spring trap end doors on said box so that in removing a frog, the door or end will close quickly and prevent the escape of any of the frogs in the cage or box. Frog boxes used heretofore have been very bulky, awkward and not collapsible, making them undesirable and for this reason, the simple construction of this device is very important.

It is also an object of this invention to have the bottom form a moisture container and the top and side walls formed of wire mesh or perforated sheets so as to give the frogs plenty of air while confined in the box.

A further object is in having the ends or trap doors of the box made of nonperforated sheet material so that when the box is collapsed, the ends will form a cover for the top and side walls which are folded into the bottom.

These objects and others will be more clearly defined in the following specification and claims.

In the drawing which forms part of this specification:

Figure 1 is a perspective of the frog box as it would appear in use.

Fig. 2 illustrates the box in collapsed or closed position.

Fig. 3 is a cross section of Fig. 2 taken on the line 3—3.

Fig. 4 is a cross section of Fig. 1 on the line 4—4.

Fig. 5 illustrates an outer view of a detail of one of the upper corners of said box when in opened position.

Fig. 6 is a cross sectional detail of one of the lower corners of said box when in opened position.

Fig. 7 is a plan view of a detail portion of one of the corners of said box when in opened position.

Fig. 8 is a detail of an alternative construction.

In the drawing A represents a frog box or cage having a solid bottom portion 1 formed with sides 2 which project at right angles upwardly from said bottom 1 and ends 3 which project upwardly at right angles from the bottom 1, to form a moisture pan.

B represents side walls which are pivotally secured in the bottom A by loops 4. The walls B are formed from a piece of wire 5 which is bent to form a frame work which is substantially rectangular in shape, having a top portion 6 and a bottom portion 7 which lie parallel to each other and ends 8 which lie parallel to each other. Both side walls B of the box A are similar in dimensions and shape. A piece of wire mesh 9 is held to the top portion 6 and the bottom portion 7 by means of the strips 10 which are bent around the wire 5 of the portions 6 and 7. The strips 10 are formed with engaging sides 11 and 12 between which the upper and lower edges of the wire mesh 9 are secured, either by soldering or riveting in a suitable manner which is not shown.

The wire mesh 9 terminates a short distance from the ends 8 of the side wall B, thus leaving a space between the edge of the wire 9 and the end 8. The loops 4 two of which are used for each side wall at each end, are adapted to engage the portion 7 of the wall B between the end 8 and the ends of the mesh 9, so as to freely hold the side walls pivoted to the bottom and allow them to fold into the bottom.

The top C is formed of a piece of wire 13 which is bent to form a substantially rectangular frame, the wire 13 being curved to form eyes or loops 14 on each corner of the same. The loops or eyes 14 are adapted to encircle the end portions 8 of the side walls and thus slidably hold the cover C to the side walls B. Loops 15 are formed on the two upper corners of the ends 8 of the side walls B so as to allow the eyes 14 to enter the loops when the box is in opened position and thus bring the top C even with the top of the side walls B. The top is preferably formed with wire mesh 16 which is held similar to the mesh 9 by means of the strips 10 to the four sides of the frame work of the cover.

A handle 17 is pivotally secured to the top by means of straps 18 which are riveted to the mesh 16 or held in any other suitable manner thereto, so that when not in use it can be turned over to lie flat on the top C.

End walls or doors 19 are pivotally secured at 20 to the ends of the bottom 1 by means of a hinge 21 which is of ordinary construction. Two coil springs 22 are wrapped about the pintle of the hinge 21 and positioned near each end, with one end 23 secured to the outer sides of the ends 3 of the bottom and the other end 24 secured to the inside of the ends 19 by means of the bands 25 which are depressed in the ends 19.

Notches 26 are formed in the upper corners of the ends 19 which are adapted to engage under the loops or eyes 14 of the cover C when they are in the loops 15 so as to hold the cover in upward position and prevent the same from sliding downward on the ends B, when the box is in use.

The ends 19 are formed with side portions 28 which project at right angles from the portions 19 and are substantially the same width as the sides 2 of the bottom 1. The sides 28 are adapted to close the opening between the end of the mesh 9 and the end portion 8 when the ends 19 are in the position illustrated in Fig. 1.

Indentations 29 are formed in the sides 28 which are adapted to register with the indentations 30 formed in the sides 2, when the ends are folded down over the side walls B and the box is in collapsed or closed position. The indentations 29 and 30 are adapted to lock the ends in closed position. The walls 30 can easily be released from the lock formed by the indentations 29 and 30 by an upward pull on the upper edge of the ends 19. The loops or eyes 14 are bent so as to lie at an angle projecting upward from the surface of the cover C so that when the box A is folded into the position illustrated in Figs. 2 and 3, the cover will lie in close proximity to the bottom 1 of the box and within the same. The side walls B are movable at their pivot points so as to rise in the straps or loops 4, thus preventing crowding or breaking of the loops 4 or the frame work of sides B. The side walls B when folded into the position illustrated in Fig. 3, impinge against the ends 19 which form a cover and when the ends are released from the locking means on the sides 2, the side walls B will tend to force the ends upward allowing the box to be opened easily.

The handle 17 is pivoted and is adapted to lie flat on the top C when the top is slid down into the bottom of the box and the box is collapsed.

It is obvious that the ends 19 can be made a little higher so as to meet in the center of the box A when the same is collapsed or folded together so as to completely cover the top and sides which are folded into the bottom when it is desired. It is also evident that a moisture pad (not shown) can be inserted in the bottom 1 to retain moisture when the box is in use.

In the construction illustrated in Fig. 8, a band portion 35 is adapted to slide freely on the portion 8 of the ends of the side walls B and is formed with a socket 36 into which the pin 37 formed on the corner of the cover C is freely pivoted. In this construction, it is not necessary to use the loops or eyes 14. The band 35 and the socket 36 allow the cover C to slide up and down freely on the portion 8 and also allow the cover to be pivoted in relation to the sides. Thus when the cover is lowered into the bottom of the box, the sides B can be folded over the cover, pivoted in the loops 14 and the cover pivoted in the socket 36 so as to prevent crowding or breaking during the folding of the box.

In accordance with the patent statutes, I have described the principles of operation of my invention, together with the apparatus which I now consider to represent the best embodiment thereof but I desire to have it understood that the construction is only illustrative and that the invention can be carried out by other means and applied to uses other than those above set forth within the scope of the following claims:

1. A collapsible frog box, comprising a bottom portion which is adapted to form a moisture pan, side walls pivotally secured in said bottom, end walls pivotally secured to said bottom and a top slidably secured to said side walls, whereby when said top is lowered into said bottom, said side walls can be folded over said top and said end walls folded over said side walls to form a thin compact device.

2. A collapsible frog box having a pan-shaped bottom portion, side walls pivotally secured to said bottom, end walls pivotally secured to said bottom, spring means for holding said end walls closed and a top slidably secured to said walls whereby said box can be collapsed so that said top will lie adjacent the bottom, the side walls will fold over said top and the end walls over said side walls.

3. A collapsible cage having a bottom portion, side and end walls pivotally secured to said bottom, a top portion, and means for slidably and pivotally securing said top to said side walls to allow said top to be slid into said bottom portion adjacent the same, with the side walls folded over said top and the end walls folded over said side walls when said box is collapsed.

4. A collapsible cage having a pan-shaped bottom portion, perforated side walls pivoted to said bottom portion, a perforated top, closed end walls pivoted to said bottom and means for connecting said top to said side walls so that said top can be slid up and down between said side walls without being disengaged therefrom for the purposes specified.

5. A collapsible frog box or cage, having a pan-like bottom portion, side walls pivotally secured by elongated loops to said bottom, and a top slidably and pivotally secured to said side walls, whereby said box can be collapsed by first sliding said top into said bottom, said side walls folding over said top and said end walls folding over said side walls, said elongated loops allowing said side walls to rise at their pivot points for the purposes specified.

6. A collapsible box, comprising a bottom which is adapted to form a container for moisture, side walls, a top slidably secured to said side walls and means for pivotally holding said walls to said bottom and allowing said side walls to rise upwardly at their pivot points, when they are folded over the top of said box when the same is collapsed.

7. A collapsible frog box, having a bottom portion which is adapted to form a moisture pan, side walls, pivotally secured by elongated loops in said bottom, a top slidably secured to said side walls, said top being adapted to slide into said bottom and said sides to fold over said top when said box is collapsed, end walls pivoted to said bottom being adapted to fold over said sides and impinge against the same, means for locking said ends in engagement with said bottom, said side walls tending to raise said ends from said bottom when said ends are disengaged from said locking means during the opening of said box.

8. A collapsible cage or frog box having a bottom portion which is adapted to form a moisture container, perforated side walls pivotally secured to said bottom, closed end walls pivoted to said bottom, a perforated top slidably secured to said side walls to allow said top to be slid up and down between said side walls during the collapsing or opening of said box and engaging means formed on said end walls for engaging the ends of said side walls to prevent accidental opening of the end walls when said box is in open position and said engaging means being adapted to engage said bottom portion when said box is collapsed with its cover lying adjacent the bottom, the side walls folded over said top and the end walls folded over said side walls.

GEORGE T. PARR.